United States Patent [19]

Sheu et al.

[11] Patent Number: 5,110,484

[45] Date of Patent: May 5, 1992

[54] DRILLING FLUID WITH STABILIZED BROWNING REACTION ANIONIC CARBOHYDRATE

[75] Inventors: Jim J. Sheu; Ronald G. Bland, both of Houston, Tex.

[73] Assignee: Baker Hughes Incorporated, Houston, Tex.

[21] Appl. No.: 544,924

[22] Filed: Jun. 28, 1990

Related U.S. Application Data

[63] Continuation-in-part of Ser. No. 529,622, May 29, 1990.

[51] Int. Cl.$^5$ ............................................. E21B 21/04
[52] U.S. Cl. ................................ 507/110; 252/8.551; 252/315.3; 523/130; 507/111
[58] Field of Search ................ 252/8.514, 8.51, 8.511, 252/8.551, 8.554, 8.515, 315.3; 523/130

[56] References Cited

U.S. PATENT DOCUMENTS

| | | | |
|---|---|---|---|
| 2,109,858 | 6/1935 | Cannon | 252/8.511 |
| 2,191,312 | 9/1937 | Cannon | 252/8.511 |
| 2,369,560 | 4/1942 | Gray | 252/8.511 |
| 2,600,404 | 6/1952 | Hoeppel | 252/8.51 |
| 2,771,138 | 11/1956 | Beeson | 166/274 X |
| 2,785,125 | 3/1957 | Salathiel | 252/8.51 |
| 2,881,211 | 4/1959 | Sperry | 252/8.515 |
| 2,951,776 | 9/1960 | Scallete et al. | 127/71 X |
| 2,956,948 | 10/1960 | Sperry | 252/8.51 |
| 3,046,221 | 7/1962 | Dodd | 252/8.511 |
| 3,146,200 | 8/1964 | Goldstein et al. | 252/8.551 |
| 3,232,871 | 2/1966 | Walker | 252/8.51 |
| 3,251,768 | 5/1966 | Walker | 252/8.551 |
| 3,314,883 | 4/1967 | Walker | 252/8.51 |
| 3,417,017 | 12/1968 | Kolian et al. | 252/8.51 |
| 3,637,493 | 11/1972 | Kolian | 252/8.51 |
| 3,841,419 | 10/1974 | Russel | 175/40 X |
| 3,843,524 | 10/1974 | Perricone | 252/1 X |
| 3,849,317 | 11/1974 | Walker | 252/8.511 |
| 3,878,110 | 10/1972 | Miller et al. | 252/8.512 |
| 3,956,141 | 5/1976 | Walker | 252/8.511 |
| 3,979,303 | 9/1976 | Kana et al. | 252/8.51 |
| 3,989,630 | 11/1976 | Walker | 252/8.511 |
| 4,048,079 | 9/1977 | Clampitt et al. | 252/8.554 |
| 4,069,869 | 1/1978 | Sandiford | 166/270 |
| 4,257,903 | 3/1981 | Kucera et al. | 252/8.51 |
| 4,413,680 | 11/1983 | Sandiford et al. | 166/270 X |
| 4,428,845 | 1/1984 | Block | 252/8.511 |
| 4,431,550 | 2/1984 | Block | 252/8.511 |
| 4,486,318 | 12/1984 | Green et al. | 252/8.511 |
| 4,667,741 | 5/1987 | Phelps et al. | 166/274 X |
| 4,719,021 | 1/1988 | Branch, III | 252/8.514 |

OTHER PUBLICATIONS

"Inorganic Chemistry", James E. Huheey, 1983, 3rd edition, p. 315.
"Introduction to Organic and Biological Chemistry", Stuart J. Baum, 1970, pp. 228-236, Chapter 11.

*Primary Examiner*—John S. Maples
*Assistant Examiner*—C. Sayala
*Attorney, Agent, or Firm*—Rosenblatt & Associates

[57] ABSTRACT

A fluid is provided for the drilling, workover or completion of a subterranean well comprising an aqueous base, the browning reaction product of a carbohydrate, and a cation. Inversion of non-reducing sugars is effected on selected carbohydrates, with the inversion also catalyzing the browning reaction. Inhibition of continued in-situ browning reaction is provided by the addition of a stabilizer.

56 Claims, 7 Drawing Sheets

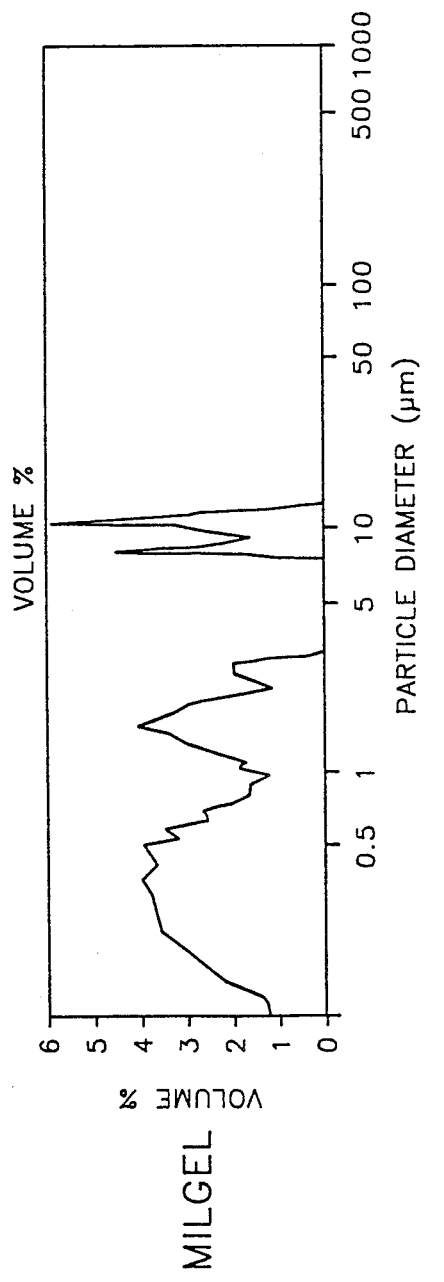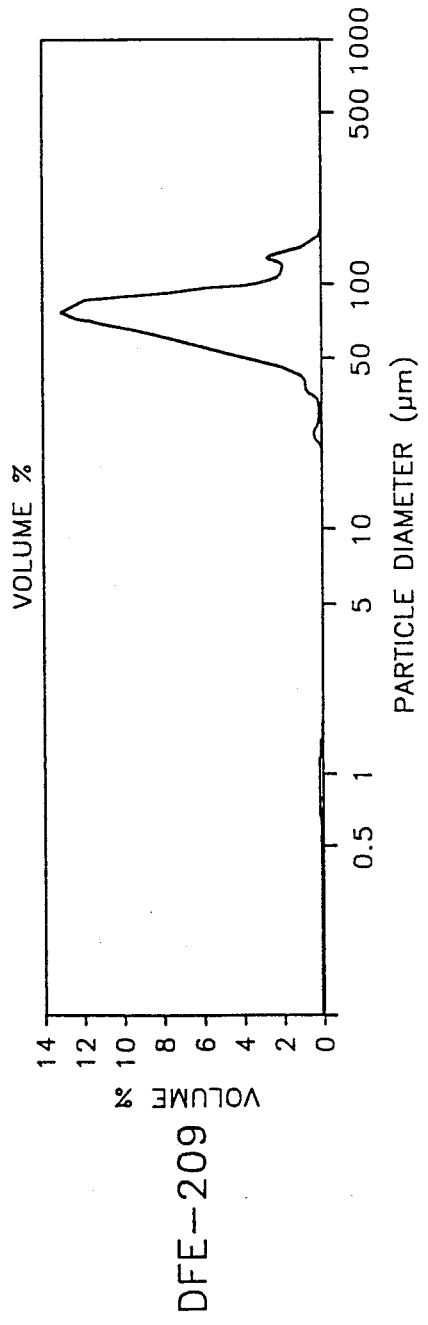

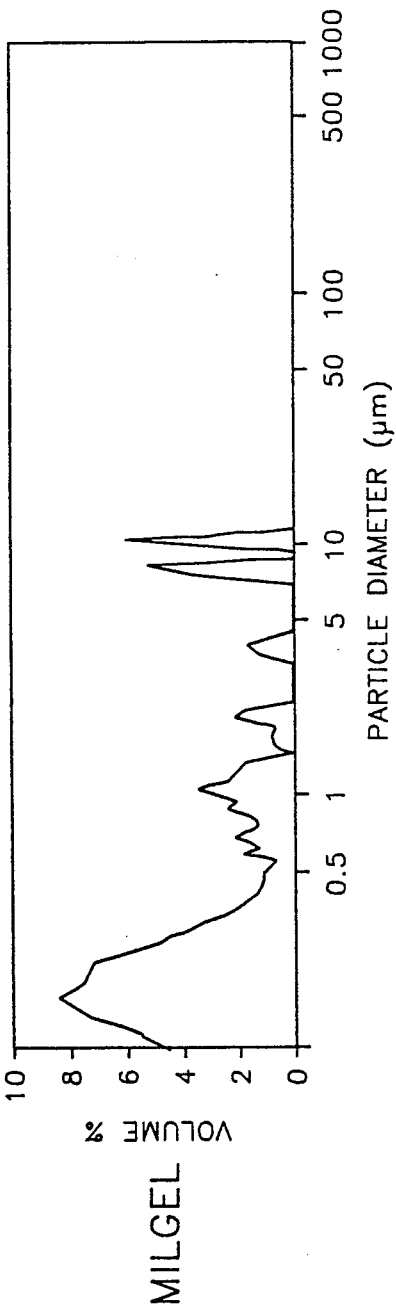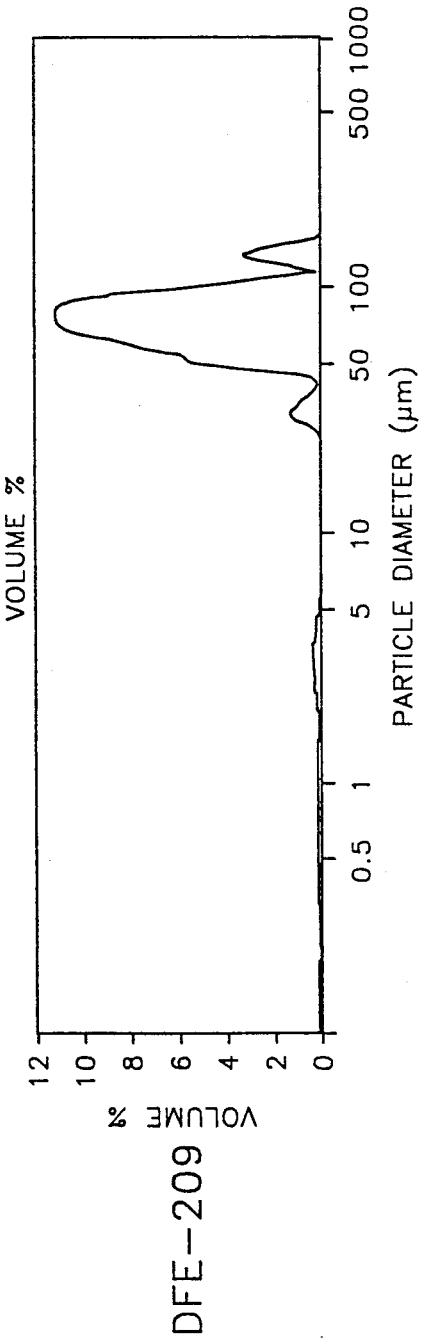

DRILLING FLUID WITH STABILIZED BROWNING REACTION ANIONIC CARBOHYDRATE

CROSS-REFERENCE TO RELATED APPLICATION

This application is a continuation-in-part application of application Ser. No. 529,622; filed May 29, 1990; entitled DRILLING FLUID WITH BROWNING REACTION ANIONIC CARBOHYDRATE; and assigned to the same assignee as the present application.

BACKGROUND OF THE INVENTION (1) Field of the Invention

The invention relates to a fluid for the drilling, workover or completion of a subterranean well and to a stabilized additive and method of inhibiting the swelling of shale with such stabilized additive in such fluid.

(2) Description of the Prior Art

Applicant is aware of the following prior art patents:

| U.S. Pat. No. | Patentee |
| --- | --- |
| 2,909,858 | Cannon |
| 2,191,312 | Cannon |
| 2,956,948 | Sperry |
| 2,881,211 | Sperry |
| 2,785,125 | Salathiel |
| 3,849,317 | Walker |

The Cannon '858 and '312 patents generally disclose the use of various polyhydroxy compounds which includes certain carbohydrates, such as sucrose, which are simultaneously added with an alkaline material, such a caustic soda, in aqueous drilling fluids for purposes of inhibiting shale swelling.

While it is questionable that a "browning reaction" as hereinafter defined, occurs in the in-situ reaction of these patents, any such reaction could be undesirable in that it is performed in an uncontrolled environment. Additionally, a browning reaction which is catalyzed by acid and enzymatic initiation is not taught or suggested in such prior art.

The Sperry '948 and '211 prior art patents disclose compositions prepared by acid "charring" of mono- and poly-saccharides, such as glucose and sucrose, within the drilling fluids by treating the saccharides with strong mineral acids at elevated temperatures. The charred saccharides may further react with alkali metal hydroxides to form a salt for purposes of providing a water loss or emulsification agent for drilling fluids. Because of "charring" as opposed to providing a browning reaction product, the chemical compositions of the products of the Sperry '948 patent differ significantly from that of the present invention.

The Salatheil '125 patent discloses a heat-alkali treated mono-, di- or poly saccharide for use in drilling fluids which additionally contain starch for controlling water loss of the fluids.

The Walker '317 patent discloses the use of a particular mixed polysaccharide product in an alkaline drilling fluid for controlling gel strength and yield point.

SUMMARY OF THE INVENTION

The present invention is directed to the provision of a stabilized combination fluid for the drilling, workover or completion of a subterranean well which comprises an aqueous base and the browning reaction product of a carbohydrate and a cation. The fluid may have one or more of a series of carbohydrates which comprise non-reducing sugars, such as molasses, or the like. In such case, the carbohydrate may be inverted by either acid or enzyme initiation to convert the non-reducing sugars to reducing sugars. In such instance, the inversion procedure also catalyzes the carbohydrate browning reaction.

The browning reaction product is anionic in nature and may be combined with a base, such as sodium aluminate, to provide a complexing agent which is useful in the inhibition of the swelling of shale found in the fluid within the subterranean well.

In inhibiting the swelling of shale, the browning reaction product first is prepared and combined with the selected cationic base and stabilized by adding a water-soluble sulfite ion producing material. Being a buffering agent as well, the water-soluble sulfite ion producing material will maintain the pH of the product in the well at no less than about 8 or 9 while inhibiting the continued undesirable browning reaction of the product at increased temperatures in the well. The sulfite ion producing material may be introduced directly into the product during manufacture or may be reacted in-situ with the product in the well. Additionally, any material capable of stabilization reaction with the cationic base and the browning reaction product may be used, i.e., in-situ production of the sulfite ion material, or by direct addition of a sulfite ion material, such as sodium, potassium or ammonium sulfite. The stabilized product may be thereafter added to the aqueous drilling fluid and circulated into and throughout the well. Upon contact of the browning reaction product and the cationic base in its complexing agent form, the material will inhibit the swelling of the shale lattice or other structure.

DESCRIPTION OF THE DRAWINGS

FIGS. 4(a) and (b) are a Colter LS-130 particle size analysis plot of the volume percent of bentonite particles of the sizes, in micrometers, indicated on the X-axis, for bentonite in deionized water compared to bentonite treated with a fluid of the present invention as described in Example 14.

FIGS. 5(a) and (b) are a Colter LS-130 particle size analysis which plots the volume percent of particles of micrometer diameters shown on the X-axis, for two samples of the same fluids as in the test plotted in FIG. 1, but after hot rolling at 150° F. for 16 hours.

DESCRIPTION OF THE PREFERRED EMBODIMENTS

Figure 1:
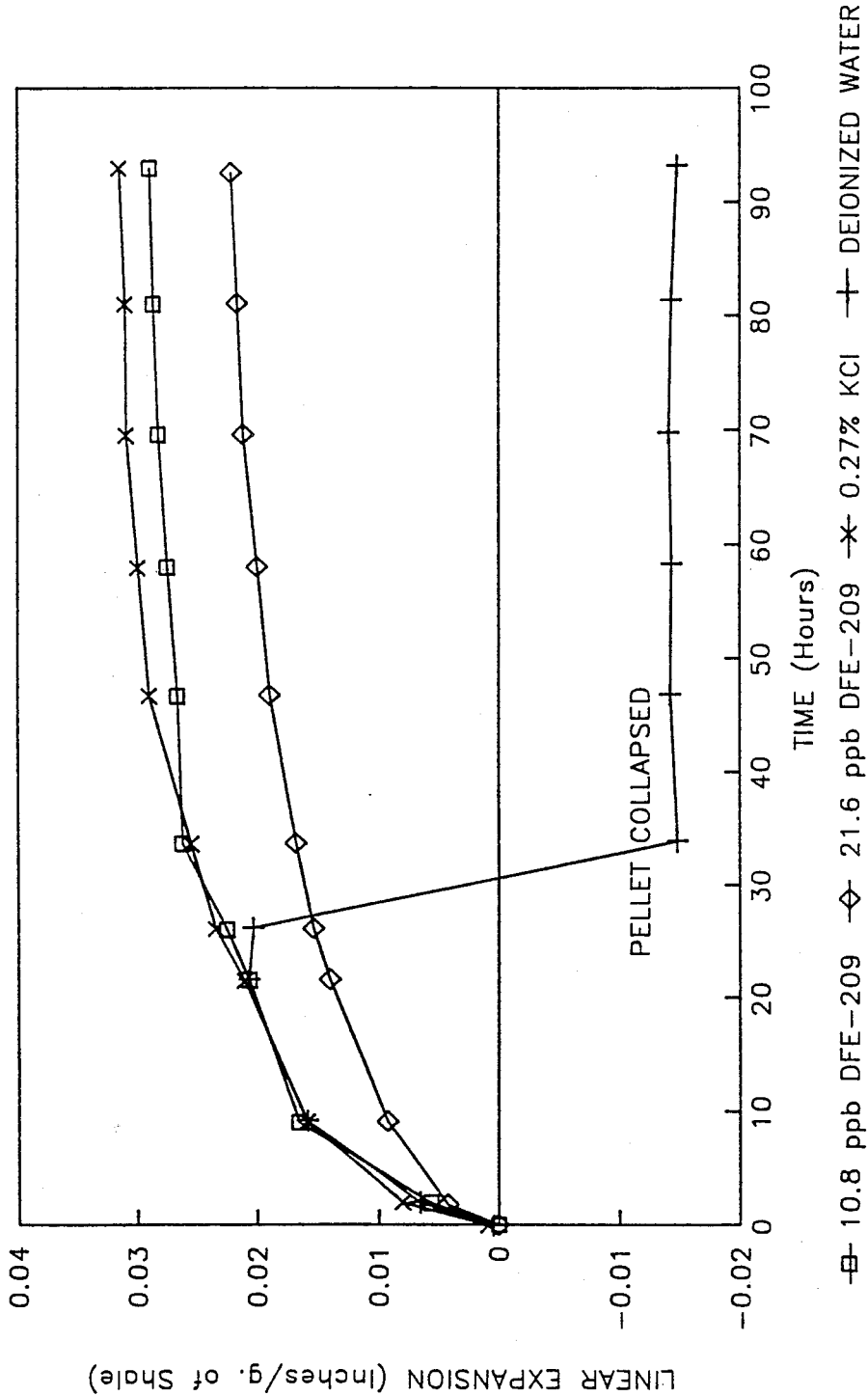
FIG. 1 is a lineal variable differential transformer plot of linear expansion in inches per gram over time of shell gumbo chips treated with the fluid as described in Example 12.

When drilling, working over or completing a subterranean well in order to tap deposits of, for example, oil or gas and in particular when utilizing a rotary drilling method comprising a bit to which is attached a drill stem, the bit will penetrate the formation. The formation is composed of both organic and inorganic substances, such as minerals, clays and the like. Most of these materials will hydrate when exposed to aqueous environments.

The aqueous medium used in the drilling, completion or workover fluid of the present invention can either be composed essentially of fresh water, brine, saturated sodium chloride, sea water, or any combinations thereof. Such drilling fluids may also contain other known drilling fluid additives, such as bentonite, barite, ethoxylated organic polymers, asbestos, gums, polymers and similar viscosity modifying agents and chemical thinners.

The combination fluid of the invention incorporates the browning reaction product of a carbohydrate, the reaction product generally being anionic in nature. By "carbohydrate", it is intended to refer to the general class of natural organic compounds, including simple sugars, such as pentose, hexose, such as fructose, as well as di- and poly saccharides, such as sucrose, lactose, mannose, cellulose, starch, dextrin, dextran, carboxymethylcellulose, rice and derivatives of such carbohydrates, such as pectin derivatives, such as pectic acid and salts thereof, guar gum, gum arabic, as well as fermentation products of the reaction of the bacteria xanthamonas campestris upon a carbohydrate. The carbohydrate may be void of non-reducing sugars, or may contain some or all non-reducing sugars. In the case of carbohydrates which contain some or all non-reducing sugars, such as molasses, and the like, inversion of such carbohydrates is desired.

In the case of sugar cane molasses, the normal juice is colorless. As it is extracted from the cane, the juice becomes light to dark golden in color, due to the natural pigments of the stalk. This is sometimes referred to as a natural or normal polymerization, also referred to as "browning" polymerization. During isolation of sucrose in molasses, certain colorless constituents react throughout the mill to produce the major colorants of the final molasses. These melanoidins, or "browning" polymers, are formed first during the juice clarification, and their concentration will increase during the production of the syrup and molasses.

Browning polymerization can be formed by the application of heat to molasses in an alkaline environment. The resulting product consists of two reducing sugars and a minimum of 15 amino acids buffered by the salts of 9 organic acids. The final molasses resulting from the processing of the juice will contain about a 20 to 30 fold increase in the concentration of most of the constituents along with two additional reducing sugars, 11 more amino acids and the salts of two more organic acids.

Sugar cane molasses solid polymers are obtained by lyophilization of the resulting aqueous polymer solution and has an elemental analysis of: carbon, 47.33%; hydrogen, 6.04%; nitrogen, 3.16%; and oxygen, 36%; after drawing to a constant mass over phosphoric anhydride under a reducing pressure at 25° C. The empirical formula for such materials is $C_{17-18} H_{26} O_{10} N$. This formula represents the average composition of many different closely related repeating units. Although not fully understood, the empirical formula strongly suggests that the basic polymer unit possess two 6-carbon residues of carbohydrate origin bound to a 4 or 6-carbon amino acid residue.

A browning reaction occurs very slowly at room temperature at a pH of 7 or less. This reaction increases as pH is increased.

It is for this reason that stabilization of the browning reaction is desirable, in order to prevent continued reaction when the final product is introduced into the well and is exposed to temperatures on the order of 250° C., and higher.

To maximize the browning reaction to provide the additive and composition of the present invention, non-reducing polysaccarhides, such as those found in molasses, are inverted. Thus, in the case of cane and molasses, the sucrose and the polysaccharides are hydrolyzed in the presence of heat to produce fructose and glucose and then dehydrated to produce furfural and caramels. The inversion reaction of the present invention can occur using acids such as, for example, sulfuric acid, or an enzyme, such as Invertase (e.g. Invertin, manufactured by Merck & Co.).

In addition to inverting carbohydrates to reducing compounds, the inversion acts as a catalyst to the browning reaction. The resulting product is believed to be a complexing agent which can be further reacted with a cationic base such as potassium hydroxide, potassium carbonate, calcium hydroxide, sodium aluminate, and the like, or cations from compounds such as iron sulfate, magnesium sulfate, manganese sulfate, and the like.

To prevent continued browning reaction from occurring in the well, a stabilizer is added to the resulting product to inhibit additional browning reaction as well as to buffer the pH. Any water-soluble material which will yield sulfite ion capable of reaction with the browning reaction product per se, or when further reacted with a cationic base to form the resulting final product, may be used as a stabilizer. The material may be reacted during manufacture, or may be later combined with the product at the well or other site. Water soluble salts, such as sodium, potassium or aluminum sulfite may be used to yield sulfite ion. Alternatively, any materials which when reacted in-situ or when otherwise combined or reacted will produce sulfite ion capable of reaction with the browning reaction product, may be used in accordance with this invention.

The required amount of the selected sulfite-ion producing material will vary, of course, depending on the composition of the particular browning reaction product, the source of the sulfite ion, and the environment within which the browning reaction product is to be utilized, i.e., temperature and other characteristics of the subterranean well and fluids used or encountered therein.

Ammonium sulfite is the preferred stabilizer, and has been found to provide satisfactory stabilization when used in a ratio (by weight) of at least about 0.012 ammonium sulfite to the total browning reaction product (including, when incorporated, the cationic base), and preferably, a ratio of about 0.012 may be used.

Regardless of the amount of the selected stabilizer used, it is the objective of the invention to introduce the stabilizer into the product to maintain the pH of the product at from between about 8 and about 9 during use in the well, and to avoid pH's in excess of this approximate range to buffer and control the inadvertent re-activation of the browning reaction.

Inhibition of swelling (hereinafter referred to as simply "inhibition") of hydratable shales has long been a problem faced by clay or colloid chemists and those skilled in arts where these materials are commercially utilized. For example, the manufacture and use of ceramics, pigments, drilling fluids, soil stabilization and construction, frequently encounter the problem of shale swelling.

By "shales" and "shale" is meant to refer to materials such as bentonite and the like, clay stones and "gumbo"-colloidal-clay substances and related substances which possess the property of hydrodynamic volume increase when exposed to aqueous environments. Of particular importance is geological formation gumbo encountered in the drilling of subterranean wells. These shales hydrate in water rather easily and may swell to many times their original size. By "swelling" we mean to refer to the hydrodyamic volume increase of the shale.

By "inhibit", "inhibition" and "inhibition of swelling" is meant to refer to the ability of a process to retard the hydration of shales whereby they remain cohered and basically in their original size, shape and volume.

Shales have been formed by a geological compaction and compression of small minute particles and sediments throughout the ages. Liquids in the particles and sediments is removed as layers of sediments compact. As pressure upon the formation increases, the liquid escapes to more permeable formations.

It is believed that ionic forces play an important role in the susceptibility of the shale to dispersion. For example, a shale having a large amount of montmorillonite containing exchangeable cations, will be more readily dispersable. As a result, these shales can have strong swelling pressures when exposed to alkaline medium.

Swelling of shales thus is believed to be attributable to at least three phenomena: surface hydration, interlayer swelling and osmotic swelling. Surface hydration is particularly active in shales because of high surface area. Shales may have a lattice-type structure which allows the liquid to be adsorbed between layers as well as upon the particle surfaces. On the other hand, osmotic swelling occurs because the clay surface ions are more concentrated than in the liquid itself. This force draws the liquid into the shale particle. Of course, the degree of the osmotic effect depends on salt concentrations both in the shale particle and in the liquid.

While other carbohydates, as identified above, may be utilized in the present invention, it is preferred to use raw molasses known to be inexpensive and to have a substantial amount of numerous non-reducing sugars, identified primarily as sucrose, to be reduced to fructose and glucose which may be accomplished by either an acid hydrolysis procedure, or by enzymatic process. Being reducing sugars, fructose and glucose are more reactive towards browning reaction.

In raw molasses inversion, it is preferred to use an acid hydrolysis procedure, as in the examples, below. The procedure for enzymatic inversion is as follows:

EXAMPLE I

Inverting Sucrose Using an Enzyme

To a three-neck round bottom flask equipped with a mechanical stirrer, a thermometer and a condenser, were added 100 g of sucrose, 50 g of deionized water and 200 g of Invertin. After mixing for 5 minutes, pH of the mixture was found to be 5.63. The mixture was brought up to 50° C. using a heating mantel and stirred for 5 hours. Care was taken to ensure that at no time the temperature of the reaction was above 65° C. since the enzyme would be destroyed. Samples were taken for HPLC analysis after 1, 3, and 5 hours. The results showed that sucrose was all converted to fructose and glucose after the first hour.

After cooling down to 40° C. with a ice-water bath, 7.68 g of sodium hydroxide was added slowly. The addition rate of sodium hydroxide could be adjusted depending upon the temperature of the mixture. If the temperature of the mixture was allowed to go up above 90° C., the mixture might generate foams. After the addition was complete, pH of the mixture was measured (10.89). Additional quantity of sodium hydroxide could be added to ensure that pH of the mixture was above 10.2. The mixture was again brought up to boil (between 100 and 103° C.) for 3 hours. The final pH of the mixture was 5.65.

EXAMPLE II

The present example demonstrates the preparation of the reaction product of a carbohydrate as contemplated in the present invention where the carbohydrate comprises a substantial amount of non-reducing sugars, and it is desired to invert those sugars by an acid into reducing counterparts.

Inversion Step

To a three neck round bottom flask equipped with a mechanical stirrer, a thermometer and a condensor, where added 1852.9 grams of molasses, 669.3 grams of deionized water and 261.1 grams of 50 weight percent sulfuric acid. The pH of the mixture was measured to ascertain that the pH of the mixture was below about 2.9. It was found that the pH was 2.51. The mixture was brought up to 105° C. using a heating mantle and stirred for three hours.

In calculating the rate of inversion of sucrose and other sugars in the selected carbohydrate, the following equation may be used:

$$I = k \, So \, t$$

$$K = ko \, [H+],$$

where I = [inverted sugars], concentration of all sugars after inversion;
k = rate constant;
So = [sucrose], concentration of starting sucrose;
t = time in minutes;
[H+] = concentration of hydrogen ions;
ko = a constant, independent of [H+], but increases rapidly with temperature; and ko = 26.797/M at 100° C.

Browning Reaction Anionic Composition Formation

An ice water bath was used and 253.3 grams of 50 weight percent sodium hydroxide was slowly added to the cooled reaction product. After the addition was complete, the pH of the mixture was measured and found to be 10.21. If necessary, an additional quantity of sodium hydroxide solution was added to provide a pH of 10.2, which is the preferably the lower range of pH for this reaction. The mixture was again brought up to between 100° C. and 103° C. for three to four hours. It is noted that any temperature above about 105° C. will result in the generation of foam and is to be avoided. The final pH of the mixture should be between six and seven, and in the present example, the final pH was 6.54.

EXAMPLE III

Example of Using High Fructose Corn Syrup (Invertose) As Starting Carbohydrate (No Inversion Required)

To a three-neck round bottom flask equipped with a mechanical stirrer, a thermometer and a condenser, were added 582.8 g of Invertose and 345.07 g of deionized water. After mixing for 5 minutes, pH of the mixture was measured (6.76). 233.44 g of 50 wt % of potassium hydroxide was added slowly. After the addition was complete, pH of the mixture was measured (13.78) again. Additional quantity of potassium hydroxide solution could be added to ensure that pH of the mixture was above 10.2. The mixture was brought up to boil (between 100° and 104° C.) for 4 hours. The pH of the mixture was found to be 7.11. 10.29 g of potassium hydroxide in 19.71 g of deionized water was added to bring the pH of the final product up to 9.86.

Formation of Quasi-Chelant with Anionic Browning Reaction Composition and Cations To a mixing container were added 3,000 grams of the above identified browning reaction material together with 811.8 grams of sodium aluminate. The mixture was stirred vigorously for 30 minutes. The product mixture designated DFE-209, contained 15.2% w/w of carboxylates. Typical compositional analysis of DFE-209 showed: 2.87% Al, 0.96% K, 5.01% Na and 48.61% solids. This material was utilized in the drilling fluids of Examples XI through XIV, set forth below.

EXAMPLE IV

The present example typifies a laboratory procedure which can be utilized to prepare a browning reaction product with the selected cation being potassium. Using the three-neck round bottom flask equipped with a mechanical stirrer as in the previous example, together with a thermometer and condensor, 8229 grams of cane molasses were added to 599.8 grams of deionized water and 1237.7 grams of weight percent sulfuric acid. After mixing for five minutes, the pH of the mixture was measured and calculated to be 2.24 and the mixture was brought up to a maximum of 105° C. using a heating mantel and stirred for three hours. After cooling down to 40° C. with an ice water bath, grams of 50 weight percent potassium hydroxide was slowly added. In order to avoid the generation of foam, the temperature was maintained below 90° C., during this point of the reaction. After the addition was complete, the pH of the mixture was determined to be 10.5 and an additional quantity of potassium hydroxide was added to insure that the pH of the mixture was maintained above about 10.2. Thereafter, the mixture was brought up to between 100° C. and 103° C. for three to four hours. The final pH of the product was found to be 9.72.

EXAMPLE V

The present example demonstrates the preparation of the browning reaction product in combination with calcium cation, where a base such as calcium hydroxide can be conveniently used.

An inversion of a selected carbohydrate, i.e., molasses, was achieved as in the previous examples, using 11399 grams of molasses, 3402.5 grams of deionized water and 1647.3 grams of 50 weight percent sulfuric acid. After mixing for five minutes, the pH was measured as 2.24 and the mixture was brought to 105° C. using a heating mantel and stirred for three hours.

After cooling down the inversion product to 40° C. with an ice water bath, 1412.6 grams of calcium hydroxide was slowly added. The addition rate of the calcium hydroxide can be adjusted depending upon the temperature of the mixture. After the addition was complete, the pH of the mixture was determined to be 11.1 and, if needed, an additional quantity of lime was added to insure that the pH of the mixture was above 10.2. The mixture was brought to a temperature of between about 100 and 103° C. for three to four hours. The final pH of the mixture was 9.3 after four hours of heating.

EXAMPLE VI

To a three-neck round bottom flask equipped with a mechanical stirrer, a thermometer and a condenser, were added 212.84 g of sucrose, 188.14 g of deionized water and 42.84 g of 50 wt % sulfuric acid. After mixing for 5 minutes, pH of the mixture was below 2.9. The mixture was brought up to 105° C. using a heating mantel and stirred for 3 hours. A sample was taken for analysis. The results showed that sucrose was all converted to fructose and glucose.

After cooling down to 40° C. with an ice-water bath, 67.34 g of 50wt % of sodium hydroxide was added slowly. The addition rate of sodium hydroxide solution could be adjusted depending upon the temperature of the mixture. If the temperature of the mixture was allowed to go up above 90° C., the mixture might generate foams. After the addition was complete, pH of the mixture was measured (10.49). Additional quantity of sodium hydroxide solution could be added to ensure that pH of the mixture was above 10.2. The mixture was again brought up to boil (between 100 and 103° C. for 3 hours). The final pH of the mixture was 5.93. The HPLC analysis of the final product indicated that browning reaction had proceeded as expected. More fructose was consumed in the reaction than glucose. Fructose was known to be more reactive than glucose towards browning reaction.

EXAMPLE VII

To a three-neck round bottom flask equipped with a mechanical stirrer, a thermometer and a condenser, were added 100 g of potato starch, 191.45 g of deionized water and 14 g of 50 wt % sulfuric acid. After mixing for 5 minutes, pH of the mixture was measured (2.40) to ascertain that the pH of the mixture was below 2.9. The mixture was brought up to 105° C. using a heating mantel and stirred for 3 hours. A sample was taken for analysis. The results showed that most potato starch was converted to glucose.

After cooling down to 40° C. with an ice-water bath, 17.1 g of 50 wt % of sodium hydroxide was added slowly. The addition rate of sodium hydroxide solution could be adjusted depending upon the temperature of the mixture. If the temperature of the mixture was allowed to go up above 90° C., the mixture might generate foams. After the addition was complete, pH of the mixture was measured (10.9). Additional quantity of sodium hydroxide solution could be added to ensure that pH of the mixture was above 10.2. The mixture was again brought up to boil (between 100 and 104° C. for 4 hours). The final pH of the mixture which had turned dark brown, was 4.91. The HPLC analysis of the final product indicated that browning reaction had proceeded as expected.

EXAMPLE VIII

Tests were conducted in order to determine the ability of the combination fluid of the present invention to inhibit the swelling of shale. Shale samples were prepared by using chips from Green Canyon Block 45 and Louisiana "gumbo". The Green Canyon composition contained the following analysis: quartz: 5–10%; feldspar: 3 to 5%; calcite: 3 to 5%; dolomite: 2 to 3%; mixed lattice expandable layers: 30 to 35%; kaolinite: 10 to 15%; chlorite: 5 to 10%; and illite: 20 to 25%. The Louisiana gumbo sample had the following composition: quartz: 5 to 10%; barite: 10 to 15%; expandable lattice structured layers: 50 to 55%; kaolinite: 5 to 10%; chlorite: 3 to 5%; and illite: 15 to 20%.

The selected material was first dried at ambient temperature for two days followed by grinding to mesh sizes between 30 and 60 (i.e. plus 60, minus 30 mesh). The volatile content of the gumbo clay was determined by drying it under vacuum "25 inches of Hg, (84.42 kPa)] at 50° C. for 18 hours. Gumbo chips were prepared by pressing about 15 grams of such sample in a one inch die with a constant force of 6000 lbf (26689 N or 7639.4 psi) for six minutes using a Carver Press. The resulting chips were one inch in diameter by one half inch in height. The chips were aged in a closed container for 24 hours before use. Gumbo chips were combined with the browning reaction product and a cationic base in conventional hot rolling tests which are conducted in a roller oven at 150° F. for 16 hours by rolling at 53 rpm samples contained within jars. The percent of shale retention plus 30 mesh, was derived using the following calculation: 100 times the weight of the gumbo chip divided by the weight of gumbo chip air dried for one hour after hot rolling and filtered through a thirty mesh screen.

EXAMPLE IX

In the present example, test samples A through D containing raw molasses were reacted with a base without inversion. Additionally, samples E and G through K containing molasses were each inverted using sulfuric acid, phosphoric acid, or nitric acid as indicated. The results of this test indicated that the acid inversion procedure of applicant's invention greatly reduced the browning reaction time in preparing the cationic material of the present invention. The results are set forth in Table IX, below:

TABLE IX

| | INCORPORATION OF POTASSIUM CATION INTO MOLASSES | | | | | | |
|---|---|---|---|---|---|---|---|
| Sample Number | Inversion by | Time for Inversion | Time for Browning Reaction | Final pH | Molasses: KOH:$H_2O$ | Pf | Mf | Ca++ (mg/l) |
| A | — | — | 18 hr. | 10.3 | 1:0.48:2.33 | 10.5 | 42.5 | 0 |
| B | — | — | 18 hr. | 9.19 | 1:0.33:2.33 | 5.5 | 23 | 960 |
| C | — | — | 23 hr. | 12.73 | 1:0.42:2.3 | 45.8 | 72.9 | — |
| D | — | — | 23 hr. | 12.55 | 1:0.26:2.3 | 30.3 | 52.7 | — |
| E | $H_2SO_4$ ($H_2SO_4$/Molasses = 0.01) | 6 hr. | 6 hr. | 9.41 | 1:0.18:2.3 | — | — | — |
| F | — | — | 12 hr. | 12.02 | 1:0.21:0.21 | 60.9 | 95.5 | — |
| G | $H_2SO_4$ ($H_2SO_4$/Molasses = 0.07) | 3 hr. | 2 hr. | 9.18 | 1:0.29:0.42 | 3.2 | 54.4 | 8720 |
| H | $H_2SO_4$ ($H_2SO_4$/Molasses = 0.07) | 3 hr. | 2 hr. | 9.72 | 1:0.29:0.43 | — | — | 8600 |
| I | $H_3PO_4$ ($H_3PO_4$/Molasses = 0.06) | 3 hr. | 4 hr. | 9.5 | 1:0.36:0.43 | 12.5 | 136.1 | 3400 |
| J | $HNO_3$ ($HNO_3$/Molasses = 0.07) | 3 hr. | 4 hr. | 9.02 | 1:0.43:0.33 | — | — | 6400 |
| K | $H_2SO_4$ ($H_2SO_4$/Molasses = 0.06) | 3 hr. | 3 hr. | 10.42 | 1:0.16:0.52 | — | — | 9400 |

EXAMPLE X

Tests were conducted similar to that set forth in the immediately previous example, but varying the cationic material. In samples L, M and N, potassium silicate was utilized as the base cation, while lime and sodium hydroxide were utilized in samples O and P, respectively. The results of this test indicated satisfactory inversion of the carbohydrate sugars and enhancement of the browning reaction time as well as satisfactory preparation of the carbohydrate material with the selected cationic base. The results of this test are set forth in Table X, below:

TABLE X

INCORPORATION OF OTHER CATIONIC BASES INTO MOLASSES

| Sample Number | Inversion by | Time for Inversion | Time for Browning Reaction | Final pH | Molasses:H$_2$O:Base | Ca++ (mg/l) |
|---|---|---|---|---|---|---|
| L | H$_2$SO$_4$ (H$_2$SO$_4$/Molasses = 0.07) | 3 hr. | 5 hr. | 9.14 | 1:0:1.18:2.77 | 520 |
| M | H$_2$SO$_4$ (H$_2$SO$_4$/Molasses = 0.05) | 3 hr. | 3 hr. | 9.7 | 1:0.35:0.59:0.07 | 1000 |
| N | H$_2$SO$_4$ (H$_2$SO$_4$/Molasses = 0.09) | 3 hr. | 4 hr. | 9.96 | 1:0.35:0.4:0.04 | 7440 |
| O | H$_2$SO$_4$ (H$_2$SO$_4$/Molasses = 0.07) | 3 hr. | 4 hr. | 9.3 | 1:0:0.37:0.12 (lime) | 45800 |
| P | H$_2$SO$_4$ (H$_2$SO$_4$/Molasses = 0.06) | 3 hr. | 3 hr. | 9.42 | 1:0:0.39:0.15 (NaOH) | — |

EXAMPLE XI

The present test was performed to evaluate samples of the materials made in previous examples to determine their capability of stabilizing shale materials. The test samples were hot rolled, as described above, and percent retention was determined, as set forth above. The samples were also tested against a treatment of the shale with partially hydrolyzed polyacrylamide, as well as a sample containing 3% potassium chloride, a well known and frequently utilized shale stabilizing material.

The results of these tests indicated that the materials each provide very good shale stabilization, particularly in view of comparison with the sample containing the partially hydrolyzed polyacrylamide, as well as the sample containing 3% potassium chloride. The results are set forth in Table XI, below:

TBLE XI

| Sample | % of Product Based on Molasses Content | Added K+ Content ppb | Added Ca++ or Na+ Content ppb | After Hot Rolling 150° F., 16 hrs. pH | pH | % Retention (+30 mesh) | NOTE |
|---|---|---|---|---|---|---|---|
| A | 30 | 24.4 | — | 7.05 | 8.75 | 93.6 | one piece |
| E | 10 | 4.4 | — | 9.41 | 8.09 | 99.9 | one piece |
| G | 8 | 5.7 | — | 9.22 | 8.62 | 112.8 | one piece |
| H | 7.8 | 5.5 | — | 9.72 | 8.48 | 107.3 | one piece, firm |
| J | 5 | 5.3 | — | 9.02 | 8.55 | 113.0 | one piece |
| J | 10 | 10.5 | — | 9.02 | 8.67 | 97.9 | one piece |
| L | 5 | 2.6 | — | 9.14 | 8.51 | 104.0 | one piece |
| L | 10 | 5.1 | — | 9.14 | 9.07 | 97.3 | one piece |
| O | 5 | — | Ca++ 1.1 | 9.3 | 7.3 | 110.1 | one piece, some swelling |
| O | 10 | — | Ca++ 2.3 | 9.3 | 7.48 | 109.4 | one piece, firm |
| P | 5 | — | Na++ 1.5 | 9.42 | 8.64 | 125.7 | one piece, some swelling |
| P | 10 | — | Na++ 3.0 | 9.42 | 8.9 | 91.8 | one piece, firm, some erosion |
| 0.405 ppb PHPA | — | — | — | 9.48 | 9.46 | 12.4 | totally disintegrated |
| 0.405 ppb, 3% KCl | — | 5.5 | — | 9.01 | 8.98 | 82.1 | one piece, firm, some erosion |

The examples below demonstrate the effectiveness of the combination fluid of the present invention, as a shale stabilizer and a thinner.

EXAMPLE XII

LVDT (Linear Variable differential Transformer) swelling tests were conducted in order to determine the ability of one combination fluid of the present invention to inhibit the swelling of shale. LVDT detects the total linear dimensional movement of a gumbo chip (¼ inch thick by 1 inch in diameter) which was somewhat confined radially by a teflon mesh. The test is sensitive and reproducible. Gumbo chips were prepared by first grinding dried gumbo clay from Green Canyon Block 45 (as in Example VIII) to mesh sizes between 100 and 200. Volatile content of the clay was determined by drying it under vacuum (25 inches of Hg) at 50° C. for 18 hours. Gumbo chips were then prepared by pressing about 10 g of such samples in a one inch die with a constant force of 12000 lbf (12000 psi) for 24 hours. Test fluids were prepared by adding the indicated weight of DFE-209 in deionized water. One fluid contained only deionized water as a standard. fluids such as 0.27 % of potassium chloride and HF-100 made by Hydra Fluids, Inc., and which can be generally described as polyglycerol mixtures, were also used as bench marks for comparison since they had been claimed to inhibit the swelling of shales effectively.

As shown in FIGS. XII-a through XII-c, the combination fluid of the present invention was more effective in inhibiting the swelling of gumbo chips against deionized water, 0.27 % potassium chloride and HF-100.

EXAMPLE XIII

As is shown in the U.S. Pat. No. 3,843,524, a rheological method was useful in determining the inhibition of shale particles. As shale hydrates, the particle will swell and occupy a greater hydrodynamic volume than for the same shale which has not been hydrated or swell as much. At a given shear rate, a swollen particle will have a higher shear stress than a non-hydrated or non-swollen particle. In short, a comparatively low rheological reading is an indication of swelling inhibition.

In Table XIII-a, fluids wee tested for inhibition of 9% sodium bentonite suspension. Thus, 35 lb per barrel (ppb) of MILGEL was stirred into each fluid for 10 minutes using a Hamilton Beach blender. The plastic viscosity, apparent viscosity, initial gel strength and 10-minute gel strength were measured both before and after the fluids were hot rolled at 150° F. for 16 hours. The fluids tested were 9.63 ppb of DFE-209, as in the present invention, 25 ppb of SHALE-TROL made by Milpark Drilling Fluids, known as aluminum citrate complex, a 2:1 ratio product, as in U.S. Pat. No. 3,843,524, and deionized water.

Inhibition of prehydrated sodium bentonite suspension was also tested. In Table XIII-b, the fluids tested were DFE-209 and UNI-CAL, made by ITT, known as chrome lignosulfonate, with various amount of REV-DUST, a product made by Milwhite Co., and which can be generally described as simulated drilled solids or clay mixtures. In Table XIII-c, the fluids tested were base mud and base mud plus additives: 3.94 ppb and 10.8 ppb of DFE-209, solid aluminum citrate complex, and UNI-CAL.

TABLE XIII-a

RHEOLOGY OF SELECTD MUDS

| 35 PPB OF MILGEL NT* ADDED | PPB USED | Al PPB | 600 | 300 | PV cp | AV cp | YP | INITIAL GELS lb/100 ft2 | 10 MIN GELS |
|---|---|---|---|---|---|---|---|---|---|
| DEIONIZED WATER | — | — | 156 | 110 | 46 | 78 | 64 | 39 | 68 |
| ALUMINUM CITRATE (2:1) | 25 | 0.28 | 24 | 15 | 9 | 12 | 6 | 3 | 15 |
| DFE-209 | 9.63 | 0.28 | 16 | 8 | 8 | 8 | 0 | 0.1 | 0.1 |
| AFTER 150° F./16 HRS. | | | | | | | | | |
| DEIONIZED WATER | — | — | 257 | 200 | 57 | 128.5 | 143 | 48 | 79 |
| ALUMINUM CITRATE (2:1) | 25 | 0.28 | 50 | 31 | 19 | 25 | 12 | 5 | 17 |
| DFE-209 | 9.63 | 0.28 | 22 | 10.5 | 11.5 | 11 | −1 | 0.1 | 0.1 |

*MILGEL NT: Sodium Bentonite, non-treated

TBLE XIII-b

RHEOLOGY OF TEST FLUIDS AFTER 150° F./16 HRS.

| | 600 | 300 | PV cp | AV cp | YP | INITIAL GELS lb/100 ft2 | 10 MIN GELS |
|---|---|---|---|---|---|---|---|
| DFE-209 | 18 | 9 | 9 | 9 | 0 | 0.1 | 0.1 |
| DFE-209 + 19.8 PPB REV DUST[1] | 26 | 12.5 | 13.5 | 13 | −1 | 0.1 | 0.1 |
| DFE-209 + 29.7 PPB REV DUST | 28 | 13 | 15 | 14 | −2 | 0.1 | 0.1 |
| DFE-209 + 39.6 PPB REV DUST | 31.5 | 16 | 15.5 | 15.75 | 0.5 | 0.1 | 0.1 |
| DFE-209 + 49.5 PPB REV DUST | 37 | 18.5 | 18.5 | 18.5 | 0 | 0.1 | 0.1 |
| UNICAL[2] | 37 | 18.5 | 18.5 | 18.5 | 0 | 0.1 | 1 |
| UNICAL + 19.8 PPB REV DUST | 42.5 | 21 | 21.5 | 21.25 | −0.5 | 0.1 | 1 |
| UNICAL + 29.7 PPB REV DUST | 48 | 25 | 23 | 24 | 2 | 0.5 | 1 |
| UNICAL + 39.6 PPB REV DUST | 59 | 32 | 27 | 29.5 | 5 | 0.5 | 1 |
| UNICAL + 49.5 PPB REV DUST | 70.5 | 38 | 32.5 | 35.25 | 5.5 | 1 | 1.5 |

*RHEOLOGY CARRIED OUT AT 120° F. MUD WEIGHT WAS 12 LB/GAL.
DFE-209-20 g of PREHYDRATED (IN 303.85 g OF WATER) MIL-GEL, 3 g OF LIGCO[4], 2 ml OF 25 NaOH, 186.5 g OF MIL-BAR AND 10.8 g OF DFE-209.
UNICAL-20 g OF PREHYDRATED (IN 303.85 g OF WATER) MIL-GEL, 3 g OF LIGCO, 2 ml OF 25% NaOH, 186.5 g OF MIL-BAR[3] AND 5 g OF UNICAL/1 g OF NaOH.
[1]SIMULATED DRILLED SOLIDS OR CLAY MIXTURES
[2]SODIUM LIGNOSULFONATE
[3]BARITE
[4]SODIUM LIGNITE

TABLE XIII-c

RHEOLOGY OF MUD SYSTEMS*

| | Al PPB | 600 | 300 | PV cp | AV cp | YP | INITIAL GELS lb/100 ft2 | 10 MIN GELS |
|---|---|---|---|---|---|---|---|---|
| BASE + SOLID SHALE-TROL | 0.31 | 36.5 | 18 | 18.5 | 18.25 | −0.5 | 0.5 | 1 |
| BASE + UNICAL | 0.00 | 55 | 28 | 27 | 27.5 | 1 | 2 | 3 |
| BASE + 10.8 PPB DFE-209 | 0.31 | 44 | 22 | 22 | 22 | 0 | 0.1 | 1 |
| BASE + 3.94 PPB DFE-209 | 0.11 | 44 | 22 | 22 | 22 | 0 | 0.5 | 14 |
| BASE | 0.00 | 85 | 52.5 | 32.5 | 42.5 | 20 | 7 | 40 |
| AFTER HOT ROLLING 150° F./16 | | | | | | | | |
| BASE + SOLID SHALE-TROL | 0.31 | 64 | 36.5 | 27.5 | 32 | 9 | 1 | 3 |
| BASE + UNICAL | 0.00 | 64 | 33 | 31 | 32 | 2 | 1 | 2 |
| BASE + 10.8 PPB DFE-209 | 0.31 | 44 | 22 | 22 | 22 | 0 | 0.1 | 1 |
| BASE + 3.94 PPB DFE-209 | 0.11 | 51.5 | 26 | 25.5 | 25.75 | 0.5 | 0.1 | 1 |
| BASE | 0.00 | 128 | 84 | 44 | 64 | 40 | 4 | 30 |

*RHEOLOGY CARRIED OUT AT 120° F. MUD WEIGHT WAS 12 LB/GAL.
**20 g OF MIGEL PREHYDRATED IN 303.85 g OF DEIONIZED WATER.
BASE-20 g OF PREHYDRATED (IN 280 ml OF WATER) MIL-GEL. 3 g OF LIGCO. 2 ml OF 25% NaOH. 186.5 g OF MIL-BAR AND 23.85 g OF WATER.
SOLID SHALE-TROL-3.3 g OF ALUMINUM SULFATE. 12-14 H₂O. 1.7 g OF CITRIC ACID AND 10 ml OF NaOH.
UNICAL-5 g OF UNICAL AND 4 ml OF 25% NaOH.

TABLE XIII-d

RHEOLOGY OF FLUIDS TREATED WITH COMBINATIONS OF BROWNING PRODUCTS AND OTHER CATIONS

| SAMPLE MIXED WITH 35 PPB OF BENTONITE | ppb USED | 600 | 300 | PV cp | AV cp | YP | 10 SEC GELS lb/100 ft2 | 10 MIN GELS |
|---|---|---|---|---|---|---|---|---|
| Browning Products & Magnesium Cation | 5.00 | 25.5 | 19.5 | 6 | 12.75 | 13.5 | 13 | 26 |
| Browning Products & Manganese Cation | 6.56 | 40 | 34.5 | 5.5 | 20 | 29 | 26 | 49 |
| Browning Products & Iron Cation | 7.41 | 20 | 15.5 | 4.5 | 10 | 11 | 21 | 56 |
| AFTER 150° F./16 HRS. | | | | | | | | |
| Browning Products & Magnesium Cation | 5.00 | 31 | 22 | 9 | 15.5 | 13 | 9 | 13 |
| Browning Products & Manganese Cation | 6.56 | 45 | 34 | 11 | 22.5 | 23 | 19 | 29 |
| Browning Products & Iron Cation | 7.41 | 22.5 | 13.5 | 9 | 11.25 | 4.5 | 5 | 8 |

In Table XIII-d, the fluids tested were tested with browning products made from the present invention and then combined with cations as indicated.

As are shown in Table XIII-a through XIII-d, rheological measurements for the fluids made from the present invention were lower than those of other fluids at their common usage levels or at equal aluminum levels. Results from these tests indicated that fluids made from this invention were more effective than others in inhibiting the swelling of shales and thinning the drilling fluids.

EXAMPLE XIV

Management of fine solids in drilling fluids are critical to the success of drilling operations. The accumulation of fine solids which are not separated by mechanical means, in general, increase the viscosity of a drilling fluid system. In time, such increase in viscosity will become unmanageable that the whole drilling fluid has to be discarded. Reducing the concentration of fine particles will certainly solve the problem. Also converting or shifting the fines to particles of larger sizes which can be separated mechanically, is a viable alternative.

One combination fluid of the present invention, DFE-209, was tested and found to decrease the distribution of solids in the range between 0.1 and 1 um. In this test, 3.5 g of sodium bentonite (MILGEL) was mixed into 350 cc of deionized water using a blender. Four such bentonite suspensions were prepared. To each of the two suspensions were added 1.62 g of DFE-209. One bentonite suspension and one bentonite suspension treated with DFE-209 were hot rolled at 150° F. for 16 hours. The remaining two suspensions were allowed to sit at room temperature for 16 hours. The top fraction of each suspension was analyzed for particle size distribution using Coulter LS-130. The results as shown in FIGS. XIV-a and XIV-b clearly indicated that particles present only in the 0.1 to 1 um range prior to DFE-209 treatment. After the treatment, particles were shifted towards 30 to 130 um range.

EXAMPLE XV

The present example demonstrates the preparation of the reaction product of a carbohydrate and combination thereof with a cationic base, together with a stabilizer. A sample material was made in accordance with the procedure of Example II and the quasi-chelant was made in accordance with the procedure of Example III. The only variation in the present procedure and that as set forth in Example II is that the product was diluted by an addition of water during the inversion step, i.e., 3419.3 g of deionized water was utilized instead of the 669.3 g of deionized water as set forth in Example II. This resulted in a variance in the compositional analysis of the material, designated as DFE-210, as follows: 1.84% Al; 0.67% K; 4.68% Na; and 32.2% solids. To samples of this material were added varying amounts of the stabilizer of the present invention. For testing purposes, sodium sulfite and ammonium sulfite stabilizers were tested, and the material was "hot rolled" in a heated oven at a temperature of 250° F. The samples were contained within jars and were placed in the roller oven at this temperature for 16 hours and rolled at 53 RPM. Thereafter, the samples were removed from the oven, permitted to cool to room temperature, and the pH was measured subsequent to the hot rolling testing, and compared to a reading of the initial pH of the test material before hot rolling. The samples were compared in contrast with the sample which contained no stabilizer. The results of this test are set forth in Table XV, below:

TABLE XV

INHIBITION OF BROWNING REACTION AND BUFFERING OF pH

| STABILIZER INHIBITOR/BUFFER | Amount Used Stabilizer: Browning Reaction Product With Cationic Base[1] | pH Before Hot-rolling | pH After Hot-rolling | Difference in pH |
|---|---|---|---|---|
| None | 0 | 10.59 | 7.55 | 3.04 |
| Sodium Sulfite | 0.006 | 10.61 | 7.73 | 2.88 |
| Sodium Sulfite | 0.012 | 10.59 | 8.24 | 2.35 |
| Sodium Sulfite | 0.036 | 10.57 | 9.27 | 1.3 |
| Sodium Sulfite | 0.059 | 10.44 | 9.52 | 0.92 |
| Sodium Sulfite | 0.118 | 10.31 | 9.64 | 0.67 |
| Ammonium Sulfite | 0.006 | 9.68 | 7.64 | 2.04 |
| Ammonium Sulfite | 0.012 | 9.65 | 8.66 | 0.99 |
| Ammonium Sulfite | 0.036 | 9.39 | 8.43 | 0.96 |
| Ammonium Sulfite | 0.059 | 9.19 | 8.19 | 1.00 |
| Ammonium Sulfite | 0.118 | 8.95 | 8.28 | 0.67 |

[1]Identified as "DFE-210" in FIGS.

The results of this test are further shown in FIGS. XVa and XVb.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A combination fluid for the drilling, workover or completion of a subterranean well, comprising:
    an aqueous medium; a prepared browning reaction product inclusive of cations produced by heating a reducing sugar in an aqueous alkaline solution at a temperature not exceeding about 105° C. effective to promote said reaction; and a stabilizing sulfite ion present in an amount effective to inhibit continuing browning reaction of said product.

2. The combination fluid of claim 1 wherein a nonreducing sugar carbohydrate is hydrolyzed by acid or enzyme initiation to product said reducing sugar.

3. The combination fluid of claim 2 wherein said carbohydrate is a member selected from the class consisting of molasses, sucrose, and starch.

4. The combination fluid of claim 1 wherein said product comprises about 15.2% by weight of carboxylates.

5. The combination fluid of claim 1 wherein said browning reaction product comprises about 2.87% aluminum; about 0.96% potassium; about 5.01% sodium and about 48.61% solids.

6. The combination fluid of claim 1 wherein said stabilizing sulfite-ion is provided by a water soluble sulfite salt.

7. The combination fluid of claim 6 wherein said sulfite salt comprises sodium sulfite.

8. The combination fluid of claim 6 wherein said sulfite salt comprises ammonium sulfite.

9. The combination fluid of claim 1 in which said solution has a pH of at least about 10 when said heating is commenced.

10. The combination fluid of claim 9 in which said heating is continued until said solution has a pH in the range from about 5 to about 7.

11. The combination fluid of claim 10 in which said reducing sugar is obtained by hydrolysis of a nonreducing carbohydrate.

12. The combination fluid of claim 11 in which said carbohydrate is selected from molasses, sucrose, and starch.

13. The combination fluid of claim 1 or 9 in which said aqueous alkaline solution is made alkaline by the hydroxide or silicate of sodium or potassium or the hydroxide of calcium, and said stabilizing sulfite ion is provided by a water soluble sulfite salt.

14. The combination fluid of claim 1 in which said aqueous alkaline solution is an aqueous solution of a strong base of which the cation is sodium, potassium, calcium or magnesium.

15. The combination fluid of claim 14 in which said reducing sugar is heated in said alkaline solution until the pH of the solution is about pH 7 or less, after which the pH of said solution is adjusted to at least about pH 9 by addition of said strong base.

16. The combination fluid of claim 1 or 15 in which said browning reaction product includes cations furnished by adding to said solution adjusted to a pH of at least about pH 9 a compound selected from the group of aluminum, iron and manganese compounds.

17. The combination fluid of claim 1 or 15 in which said browning reaction product includes aluminum cations furnished by addition of sodium aluminate to said solution.

18. A combination fluid for the drilling, workover or completion of a subterranean well, comprising:
    (a) an aqueous medium;
    (b) a prepared browning reaction product inclusive of cations produced by (i) heating an acidic aqueous solution of a nonreducing carbohydrate at a temperature not exceeding about 105° C. until the nonreducing carbohydrate is substantially completely hydrolyzed to reducing sugars, (ii) adding sufficient hydroxide or silicate of sodium or potassium cations or sufficient hydroxide of calcium or magnesium cation to said solution containing said reducing sugars to make the solution alkaline with a pH of at least about 10, (iii) heating said alkaline solution to a temperature not exceeding about 105° C. effective to promote browning reaction, until the pH of said solution is in the range from about 5 to about 7, (iv) adding sufficient of said hydroxide or silicate to said solution having a pH in the range from about 5 to about 7 to increase the pH to at least about pH 9, and (v) adding sodium aluminate to said solution having a pH of at least about pH 9; and (c) a water soluble sulfite salt present in an amount effective for sulfite ion to inhibit continuing browning reaction of said product of clause (b).

19. The combination fluid of claim 18 in which said sulfite salt is selected from sodium sulfite and ammonium sulfite.

20. A drilling fluid additive, comprising (a) a prepared browning reaction product inclusive of cations produced by heating a reducing sugar in an aqueous alkaline solution at a temperature not exceeding about 105° C. effective to promote said reaction, and (b) a stabilizing sulfite ion present in an amount effective to inhibit continuing browning reaction of said product.

21. The drilling fluid additive of claim 20 wherein a nonreducing carbohydrate is hydrolyzed by acid or enzyme initiation to produce said reducing sugar.

22. The drilling fluid additive of claim 20 or 21 wherein said carbohydrate is a member selected from the class consisting of molasses, sucrose, and starch.

23. The drilling fluid of claim 20 wherein said product comprises about 15.2% by weight of carboxylates.

24. The drilling fluid additive of claim 20 wherein said browning reaction product comprises about 2.87% aluminum; about 0.96% potassium; about 5.01% sodium and about 48.61% solids.

25. The drilling fluid of claim 20 wherein said stabilizing sulfite ion is provided by a water soluble sulfite salt.

26. The drilling fluid of claim 25 wherein said sulfite salt comprises sodium sulfite.

27. The drilling fluid of claim 25 wherein said sulfite salt comprises ammonium sulfite.

28. The drilling fluid additive of claim 20 in which said solution has a pH of at least about 10 when said heating is commenced.

29. The drilling fluid additive of claim 28 in which said heating is continued until said solution has a pH in the range from about 5 to about 7.

30. The drilling fluid additive of claim 29 in which said reducing sugar is obtained by hydrolysis of a nonreducing carbohydrate.

31. The drilling fluid additive of claim 30 in which said carbohydrate is selected from molasses, sucrose, and starch.

32. The drilling fluid additive of claim 9 or 28 in which said aqueous alkaline solution is made alkaline by the hydroxide or silicate of sodium or potassium or the hydroxide of calcium, and said stabilizing sulfite ion is provided by a water soluble sulfite salt.

33. The drilling fluid additive of claim 20 in which said aqueous alkaline solution is an aqueous solution of a strong base of which the cation is sodium, potassium, calcium or magnesium.

34. The drilling fluid additive of claim 33 in which said reducing sugar is heated in said alkaline solution until the pH of the solution is about pH 7 or less, after which the pH of said solution is adjusted to at least about pH 9 by addition of said strong base.

35. The drilling fluid additive of claim 20 or 34 in which said browning reaction product further includes cations furnished by adding to said solution adjusted to a pH of at least about pH 9 a compound selected from the group of aluminum, iron and manganese compounds.

36. The drilling fluid additive of claim 20 or 34 in which said browning reaction product includes aluminum cations furnished by addition of sodium aluminate to said solution adjusted to a pH of at least about pH 9.

37. A drilling fluid additive, comprising (a) a prepared browning reaction product produced by (i) heating an acidic aqueous solution of a nonreducing carbohydrate not exceeding about 105° C. until the nonreducing carbohydrate is substantially completely hydrolyzed to reducing sugars, (ii) adding sufficient hydroxide or silicate of sodium or potassium cations or sufficient hydroxide of calcium or magnesium to said solution containing said reducing sugars to make the solution alkaline with a pH of at least about 10, (iii) heating said alkaline solution to a temperature not exceeding about 105° C. effective to promote browning reaction, until the pH of said solution is in the range from about 5 to about 7, (iv) adding sufficient of said hydroxide or silicate to said solution having a pH in the range from about 5 to about 7 to increase the pH to at least about pH 9, and (v) adding sodium aluminate to said solution having a pH of at least about pH 9, and (b) a water soluble sulfite salt present in an amount effective for sulfite ion to inhibit continuing browning reaction of said product of clause (a).

38. The drilling fluid additive of claim 37 in which said sulfite salt is selected from sodium sulfite and ammonium sulfite.

39. The method of inhibiting the swelling of shale in an aqueous alkaline drilling fluid in a subterranean well, comprising the steps of:

(1) introducing in said fluid at least about 1% of an additive comprising (a) a prepared browning reaction product inclusive of cations produced by heating a reducing sugar in an aqueous alkaline solution at a temperature not exceeding about 105° C. effective to promote said reaction, and (b) a stabilizing sulfite ion present in an amount effective to inhibit continuing browning reaction of said product;

(2) circulating said fluid containing said additive into and through said well; and (3) contacting said shale during said circulation with a swelling inhibiting amount of said additive.

40. The method of claim 39 wherein a nonreducing carbohydrate is hydrolyzed by acid or enzyme initiation to product said reducing sugar.

41. The method of claim 40 wherein said carbohydrate is a member selected from the class consisting of molasses, sucrose, and starch.

42. The method of claim 39 wherein said product comprises about 15.2% by weight of carboxylates.

43. The method of claim 39 wherein said browning reaction product comprises about 2.87% aluminum; about 0.96% potassium; about 5.01% sodium and about 48.61% solids.

44. The method of claim 39 wherein said stabilizing sulfite ion is provided by a water soluble sulfite salt.

45. The method of claim 44 wherein said sulfite salt comprises sodium sulfite.

46. The method of claim 44 wherein said sulfite salt comprises ammonium sulfite.

47. The method of claim 39 in which said solution has a pH of at least about 10 when said heating is commenced.

48. The method of claim 47 in which said heating is continued until said solution has a pH in the range from about 5 to about 7.

49. The method of claim 48 in which said reducing sugar is obtained by hydrolysis of a nonreducing carbohydrate.

50. The method of claim 49 in which said carbohydrate is selected from molasses, sucrose, and starch.

51. The method of claim 39 or 47 in which said aqueous alkaline solution is made alkaline by the hydroxide or silicate of sodium or potassium or the hydroxide of calcium, and said stabilizing sulfite ion is provided by a water soluble sulfite salt.

52. The method of claim 39 in which said aqueous alkaline solution is an aqueous solution of a strong base of which the cation is sodium, potassium, calcium or magnesium.

53. The method of claim 52 in which said reducing sugar is heated in said alkaline solution until the pH of the solution is about pH 7 or less, after which the pH of said solution is adjusted to at least about pH 9 by addition of said strong base.

54. The method of claim 39 or 53 in which said browning reaction product further includes cations furnished by adding to said solution adjusted to a pH of at least about pH 9 a compound selected from the group of aluminum, iron and manganese compounds.

55. The combination fluid of claim 39 or 53 in which said browning reaction product further includes trivalent aluminum cations furnished by addition of sodium aluminate to said solution adjusted to a pH of at least about pH 9.

56. The method of inhibiting the swelling of shale in an aqueous alkaline drilling fluid in a subterranean well, comprising the steps of:
(1) introducing in said fluid at least 1% of a stabilized prepared browning reaction product additive produced by (i) heating an acidic aqueous solution of a nonreducing carbohydrate at a temperature not exceeding about 105° C. until the nonreducing carbohydrate is substantially completely hydrolyzed to reducing sugars, (ii) adding sufficient hydroxide or silicate of sodium or potassium cations or sufficient hydroxide of calcium or magnesium cation to said solution containing said reducing sugars to make the solution alkaline with a pH of at least about 10, (iii) heating said alkaline solution to a temperature not exceeding about 105° C. effective to promote browning reaction, until the pH of said solution is in the range from about 5 to about 7, (iv) adding sufficient of said hydroxide or silicate to said solution having a pH in the range from about 5 to about 7 to increase the pH to at least about pH 9, and (v) adding sodium aluminate to said solution having a pH of at least about pH 9, and (vi) adding a water soluble sulfite salt before or after step (iv) or (v) in an amount effective to inhibit continuing browning reaction after said sodium aluminate is added;
(2) circulating said fluid containing said additive into and through said well; and
(3) contacting said shale during said circulation with a swelling inhibiting amount of said additive.

* * * * *

UNITED STATES PATENT AND TRADEMARK OFFICE
CERTIFICATE OF CORRECTION

PATENT NO. : 5,110,484            Page 1 of 2

DATED : May 5, 1992

INVENTOR(S) : Jim J. Sheu and Ronald G. Bland

It is certified that error appears in the above-identified patent and that said Letters Patent is hereby corrected as shown below:

At column 2, line 41, please delete "shell" and insert --shale-- therefor.

At column 2, line 43, please delete "12" and insert --XII-- therefor.

At column 2, line 45, please delete "shell " and insert --shale-- therefor.

At column 2, line 47, please delete "12" and insert --XII-- therefor.

At column 2, line 49, please delete "shell" and insert --shale-- therefor.

At column 2, line 51, please delete "12" and insert --XII-- therefor.

At column 2, line 51, please delete "12" and insert --XII-- therefor.

At column 2, line 52, please delete "Colter" and insert --Coulter-- therefor.

At column 2, line 57, please delete "14" and insert --XIV-- therefor.

At column 2, line 58, please delete "Colter" and insert --Coulter-- therefor.

At column 2, lines 61-62, please delete "FIG. 1" and insert --FIG. 4-- therefor.

At column 4, line 31, please delete "cationic".

UNITED STATES PATENT AND TRADEMARK OFFICE
CERTIFICATE OF CORRECTION

Figure 2:
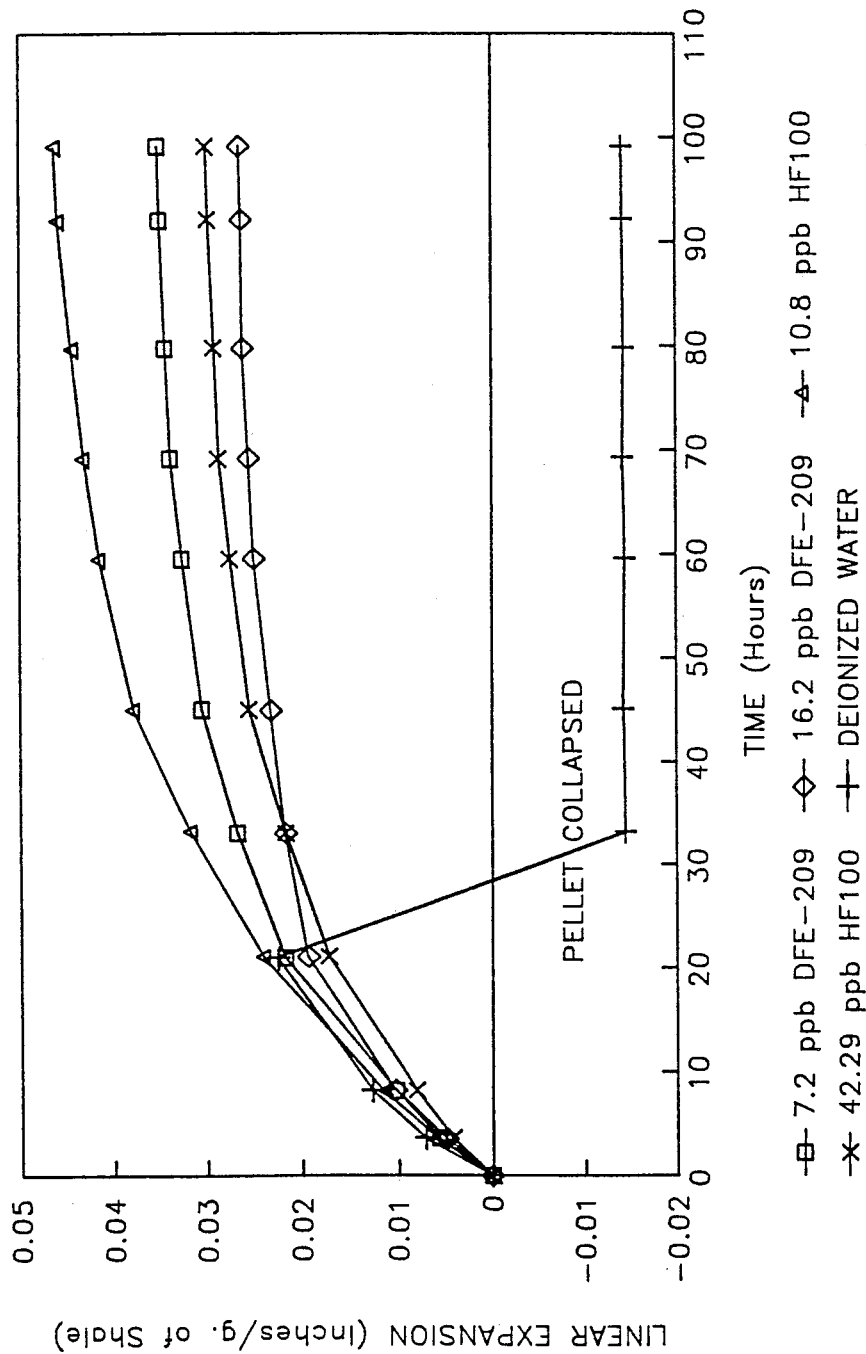
FIG. 2 is a linear variable differential transformer plot of the linear expansion, in inches per gram, of shell gumbo chips treated with fluids as described in Example 12 at the fluid concentrations shown on the figure.
Figure 3:
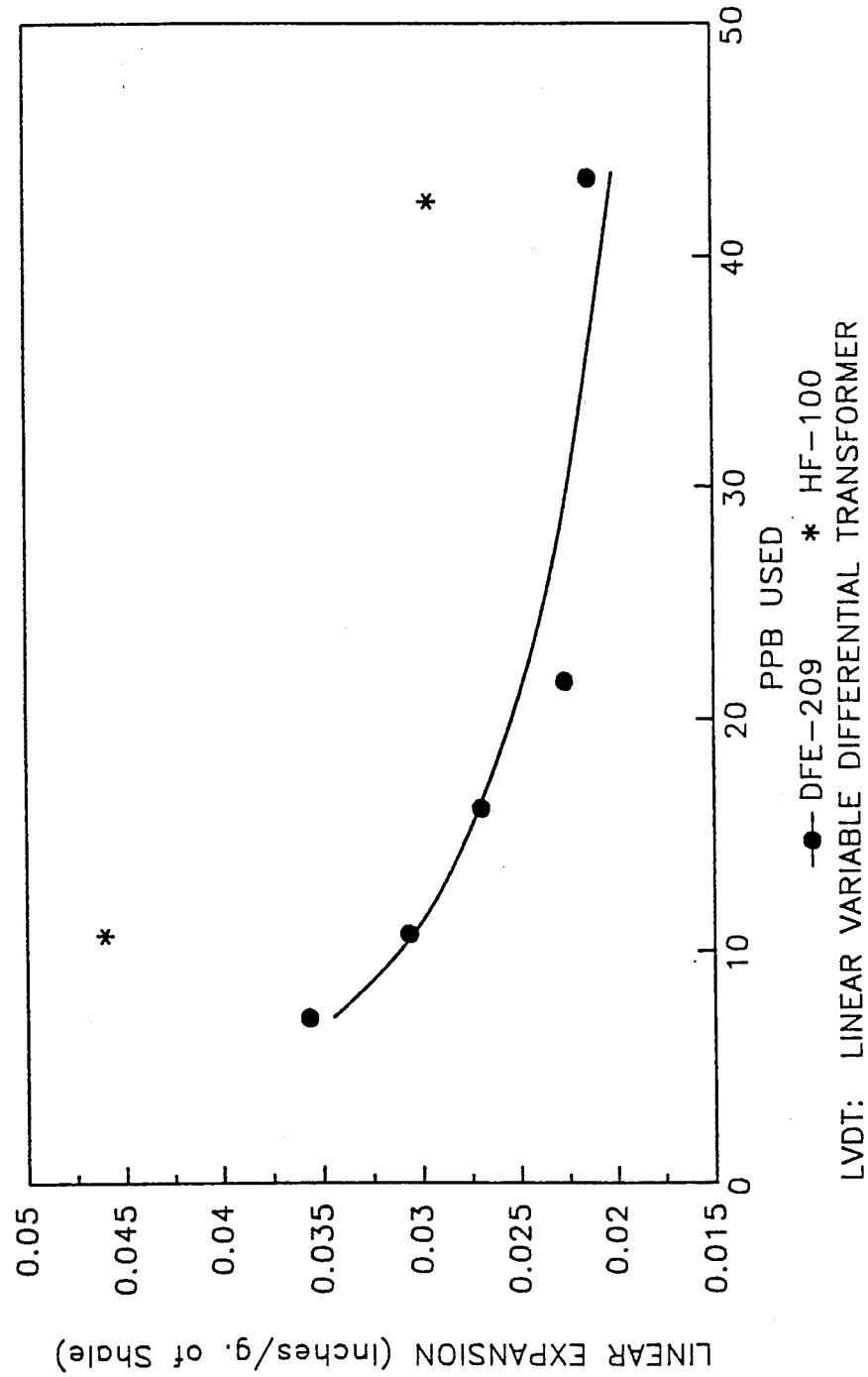
FIG. 3 is a linear variable differential transformer test of the linear expansion, in inches per gram, of shell gumbo chips treated with fluids described in Example 12 at various concentrations as described in Example 12.

PATENT NO. : 5,110,484
DATED : May 5, 1992
INVENTOR(S) : Jim J. Sheu and Ronald G. Bland It is certified that error appears in the above-identified patent and that said Letters Patent is hereby corrected as shown below:

At column 13, line 18, please delete "FIGS. XII-a through XII-c" and insert --FIGS. 1 through 3-- therefor.

At column 16, line 38, please delete "FIGS. XIV-a and XIV-b" and insert --FIGS. 4 and 5-- therefor.

Figure 6:
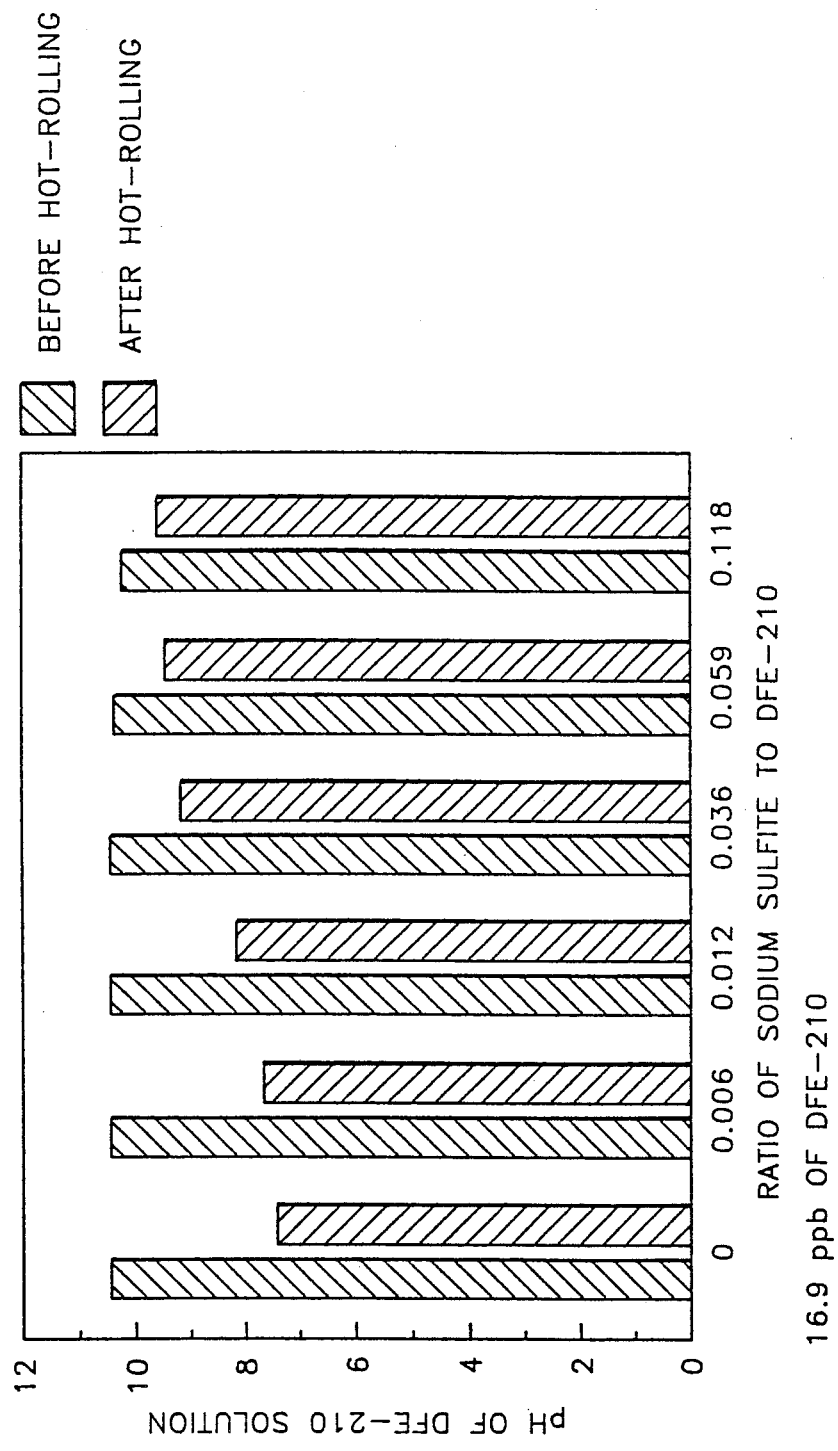
FIG. 6 is a plot of pH change of solutions prepared in accordance with the present invention at different inhibitor treating concentrations after hot rolling at 250° F. for 16 hours, using sodium sulfite as the inhibitor.
Figure 7:
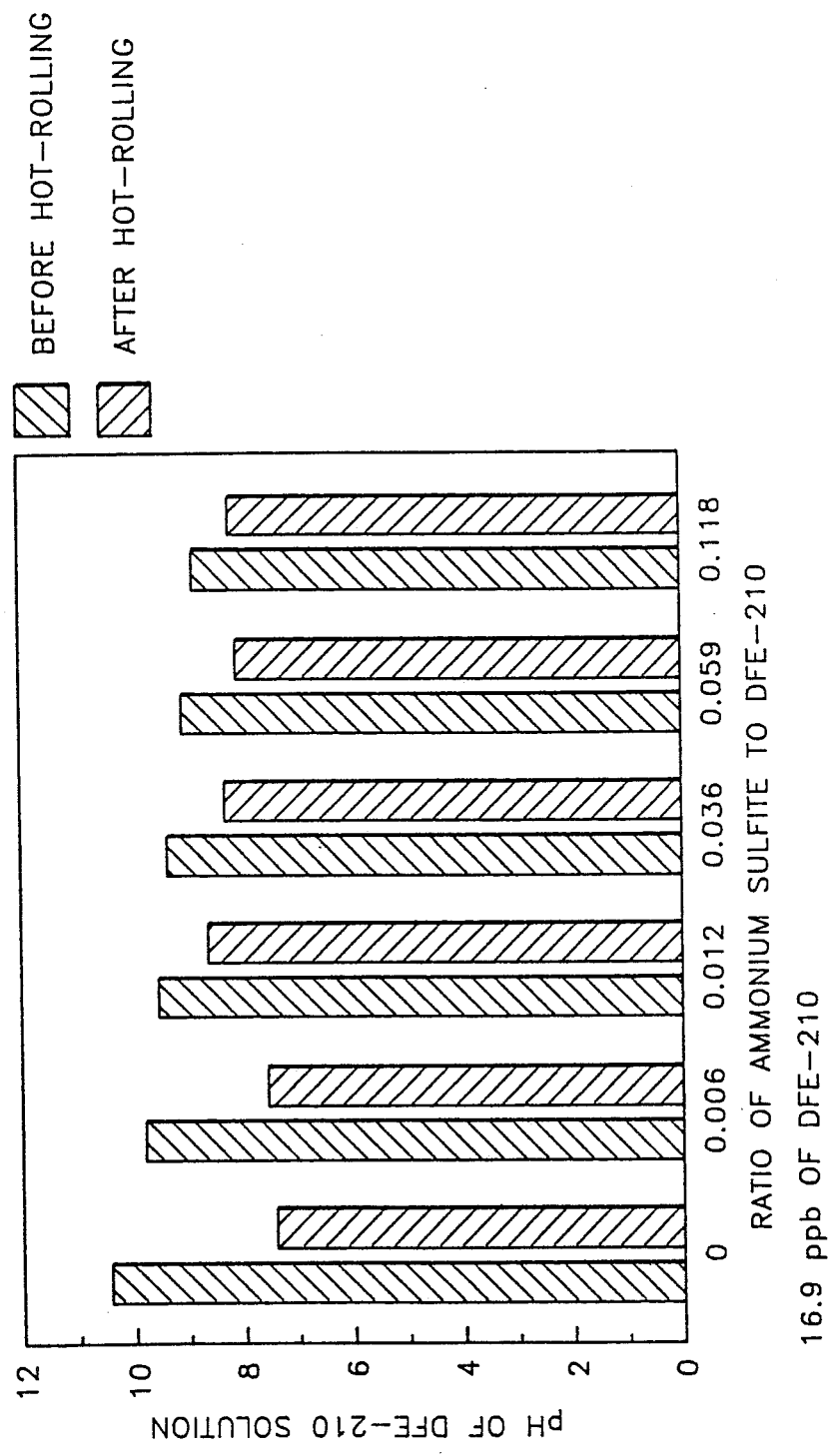
FIG. 7 is a plot of pH change of solutions prepared in accordance with the present invention at different inhibitor treating concentrations, after hot rolling at 250° F. for 16 hours, using ammonium sulfite as the inhibitor.

At column 17, line 25, please delete "FIGS. XVa and XVb" and insert --FIGS. 6 and 7-- therefor.

Signed and Sealed this

Third Day of May, 1994

*Attest:*

BRUCE LEHMAN

*Attesting Officer*        *Commissioner of Patents and Trademarks*